(12) United States Patent
Clifford et al.

(10) Patent No.: US 7,622,158 B2
(45) Date of Patent: Nov. 24, 2009

(54) COMPACT ROBOTIC PAINTING BOOTH

(75) Inventors: Scott J. Clifford, Rochester Hills, MI (US); James M. Kowalski, Lake Orion, MI (US); Martin D. Rola, Oakland Township, MI (US); Donald S. Bartlett, Troy, MI (US); Paul D. Copioli, Sterling Heights, MI (US); James B. Gerds, II, Rochester Hills, MI (US); Marcin Gora, Shelby Township, MI (US); Stan H. McCloskey, Rochester Hills, MI (US)

(73) Assignee: Fanuc Robotics America, Inc., Rochester Hills, MI (US)

( * ) Notice: Subject to any disclaimer, the term of this patent is extended or adjusted under 35 U.S.C. 154(b) by 526 days.

(21) Appl. No.: 11/417,368

(22) Filed: May 4, 2006

(65) Prior Publication Data

US 2006/0292308 A1 Dec. 28, 2006

(51) Int. Cl.
B05B 3/00 (2006.01)
B05B 15/12 (2006.01)
B05B 3/02 (2006.01)
B05D 1/02 (2006.01)

(52) U.S. Cl. .................. 427/427.2; 427/427.3; 427/424; 118/323; 118/314; 118/315; 118/324; 118/326; 901/43; 239/752

(58) Field of Classification Search .................. 118/323, 118/321, 324, 326, 313–316, 300, DIG. 7; 901/27, 29, 41, 43; 700/245; 74/490.04; 427/427.2, 427.3, 424; 55/DIG. 56; 454/50, 454/53; 239/752
See application file for complete search history.

(56) References Cited

U.S. PATENT DOCUMENTS

| 4,532,148 | A | * | 7/1985 | Vecellio ...................... 427/480 |
| 4,705,243 | A | * | 11/1987 | Hartmann et al. ............. 248/51 |
| 4,721,630 | A | | 1/1988 | Takeo et al. |
| 5,014,644 | A | * | 5/1991 | Yamamoto et al. .......... 118/314 |

FOREIGN PATENT DOCUMENTS

| EP | 0 192 338 | 8/1986 |
| EP | 0 885 575 | 7/1998 |
| EP | 1 263 535 | 6/2004 |
| WO | WO 01/68267 | 9/2001 |

* cited by examiner

Primary Examiner—Yewebdar T Tadesse
(74) Attorney, Agent, or Firm—Fraser Clemens Martin & Miller LLC; William J. Clemens

(57) ABSTRACT

A system for painting an article, such as an automotive vehicle body, includes a painting booth, a conveyor for transporting articles through the painting booth, a first rail located beside and extending along the conveyor, a second rail located beside and extending along the conveyor at a lower elevation than an elevation of the first rail, a paint robot including an articulating arm mounted on the first rail for displacement along the first rail, a panel opener robot mounted on the second rail for displacement along the second rail such that the paint robot and the panel opener robot can move past each other on the rails without interference.

19 Claims, 12 Drawing Sheets

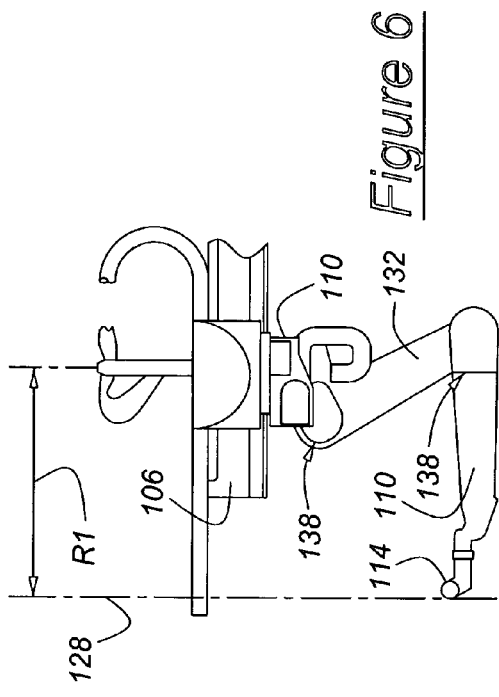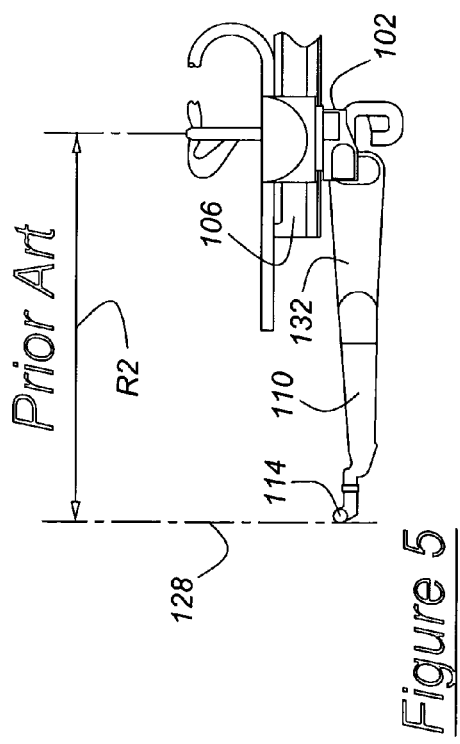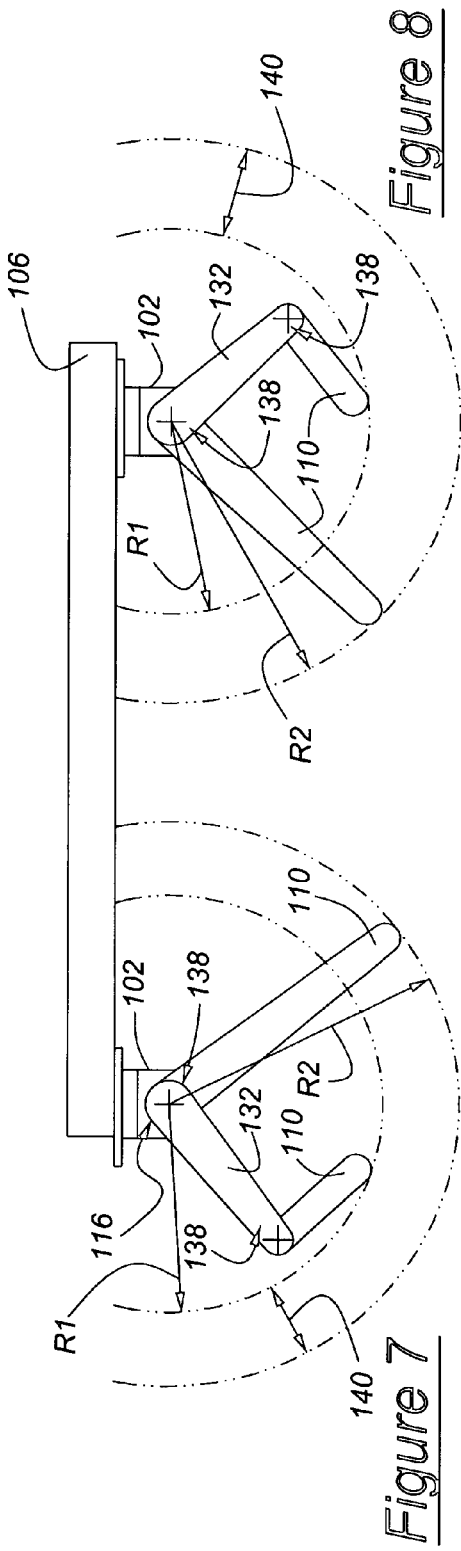

COMPACT ROBOTIC PAINTING BOOTH

CROSS-REFERENCE TO RELATED APPLICATIONS

This application claims the benefit of U.S. Provisional Application No. 60/517,767, filed Nov. 6, 2003, and 60/583,078, filed Jun. 25, 2004, the entire disclosures of which are incorporated herein by reference.

BACKGROUND OF THE INVENTION

The present invention relates generally to a robotic system for processing an article in serial high-volume production. More particularly, the invention pertains to minimizing the size of a painting booth containing a robotic system used to paint a motor vehicle body.

The safety zone is an area in a painting booth where people could be present while a robot, mounted for movement along a rail beside a conveyor, operates. Frequently people are present in the booth to view the robot in operation. It is conventional practice to use a limit switch, mounted on the rail, to stop the robot at a fixed location on the rail and prevent an articulating robot arm from entering the safety zone located at the end of the rail. If the robot travels too far down the rail, it will trip the limit switch and cause the robot to stop before the arm enters the safety zone.

Other techniques have been employed to guard against personal injury caused by a robot operating in a painting booth. For example, a light curtain, located at the boundary of the safety zone, stops the robot from entering the safety zone when the curtain is crossed by the end of the robot arm or tooling carried by the arm. The light curtain reduces the length of the rail and paint booth because it allows the robot to move to the end of the rail provided it does not cross the light curtain.

In an automotive paint booth, it is conventional to use a silhouette or cattle fence between the safety zone and the robot. The silhouette is a wall with a cutout slightly larger then the envelope of the vehicle body being process in the booth. The cattle fence is a railing that partially isolates the safety zone from the robot-painting zone. The cattle fence extends from the sidewall of the booth into the booth. There is an opening in the middle of the cattle fence that allows vehicle bodies to pass through the fence.

These devices are awareness barriers to remind people to stay out of the working range of the robot rather then a wall that is designed stop the robot. The light curtain typically extends from one side of the booth to the other side. But the light curtain must be disabled when the vehicle body is present because the vehicle body would otherwise break the light beam as the body passes along the conveyor path. Therefore, a control system is required to disable the light curtain, when the vehicle body passes through the light curtain. However, paint booth operators prefer that a safety emergency stop system operate independently of a control system, which, if operating correctly, would prevent the robot from entering the safety zone. Once the light curtain is disabled to allow the vehicle body to pass through the curtain boundary, booth occupants would not be protected from the robot if it went out of control and passed through the silhouette or cattle fence.

The limit switch wastes rail and booth line length. The light curtain must rely on a control system to disable the curtain when a vehicle body passes through the curtain boundary. When the light curtain is disabled to allow a vehicle body to pass, it doesn't offer any protection to a person in the safety zone. If control of the robot is lost while the curtain is disabled, the robot could pass through the silhouette or cattle fence undetected and enter the safety zone.

A technique is required that avoids wasted rail and booth length preferably by synchronizing the trip point of a limit switch based on the position of the rail and the angle of articulation of the robot the waist.

Other methods to reduce the size of a robotic paint booth and improve paint booth process throughput are required. For example, a painting robot, door opener robot, and a hood/deck opener robot, mounted on rails in the paint booth, would operate more efficiently if they could pass each other on the rails while performing their respective tasks.

Space in the paint booth that is required to accommodate direct charge atomizers could be saved by using a paint applicator, such as a rotary atomizer, that ionizes a stream of air directed onto the atomized paint produced by the atomizer.

A method to isolate a nonconductive paint component from a conductive component before mixing them is required when using a direct charge electrostatic application, in which the fluid stream is charged via direct contact with a high voltage probe.

paint utility line failures are costly and time consuming to repair. It is necessary to support paint system utility lines connected across an articulating joint of a robot arm against failure induced by flexing the lines as the arm articulates. An arrangement of the utility lines that minimizes flexural displacement is required.

A goal of automatic painting equipment is to change rapidly from one paint color to another. Often the painting equipment includes a dump circuit, fluid passages used to carry cleaning solvent and waste paint from the system, as a means for venting existing air in the system before paint flow starts. It is preferable that a dump circuit for the solvent and waste paint land, and a vent circuit for venting air would be arranged for coordinated operation in order to expedite a cleaning operating, in which lines and operating components are cleaned and flushed of waste paint and solvent, and a color change operation, in which the system is filled with a new paint color.

SUMMARY OF THE INVENTION

The present invention concerns a robotic painting system for painting surfaces of a vehicle body including the interior surfaces of doors, hoods and decks. The system is located in a paint booth and includes a paint robot, a door opener robot, and a hood/deck opener robot mounted on rails that extend along a conveyor that carries the body through the booth. The paint robot operates to paint the surfaces of the vehicle body using a bell cup applicator or the like. The door opener robot operates to move a vehicle door into a position so that the paint robot may paint its interior and exterior surfaces. Similarly, the hood/deck opener robot moves a hood and/or a deck lid of the vehicle body into a position so that the paint robot may paint its interior and exterior surfaces. Each of the robots can pass by the painting system, the other robots, and the vehicle body without interference while its doors, hood, and a deck lid are open.

Each opener robot can hand off an opened body panel to another opener robot. The door opener robot is positioned to minimize paint over-build-up. The system and method of this invention allow use of a compact indirect charge system for waterborne paint and direct charge fast color change systems for solvent and water-based materials.

A cam actuated limit switch assembly located at an articulating joint of a robot arm decreases the lengths of the rail and paint booth. A the arm becomes increasingly aligned with the axis of the rail, the limit switch is actuated to stop robot movement when the robot is at progressively greater distances from the end of the rail in order to prevent the end of the robot arm from entering the safety zone. But as the robot arm becomes increasingly articulated out of alignment with that axis, the limit switch is actuated when the robot is progressively closer to the end of the rail and before the end of the robot arm enters the safety zone. Therefore, to the extent that the robot arm is extended laterally away from the rail and toward the article being processed in the paint booth, the rail's length and the paint booth's length are reduced by use of the limit switch assembly.

The system can operate in a reliable manner with similar maintenance intervals to those of other automotive class rotary atomizers. The benefits of the ionized air charging method and system are particularly useful for (a) continuous painting systems using conductive paints, such as waterborne fascia painting systems or automotive body exterior systems using batch painting methods; (b) painting systems using a combination of conductive and non-conductive paints; and (c) painting systems used to the interior compartments of automotive vehicles, where the non-incendiary benefits prevent electrostatic discharge, thus impeding ignition of the atomized paint cloud.

The paint utility line that supply electric power, paint, solvent, control system communications, etc. to the robot arm and paint system are protected against flexural failure as the arm articulates by securing them to the robot such that the lines are spaced in a wide, thin ribbon by a separator control bar located between a single bundle clamp and a staggered bundle clamp.

A paint system controller controls operation of a dump valve and vent valve, arranged in parallel with the dump valve, such that the vent valve is opened during a color change operation to vent air through narrow flow passages to a dump collector. The system opens the dump valve to the collector during a cleaning operation, which flushes solvent and waste paint from the supply lines and components of the painting system to the collector. This arrangement and control provides an advantage since the dump valve must be closed at precisely the right time in the process to gain the maximum benefit of venting all the air in the system, while preventing paint from being wasted through the dump passage. At the high flow rates desired for rapid color changing, inaccurate timing of even a fraction of a second can result in unacceptably high paint waste volumes. For example, in a conventional system, filling or priming at 1200 cc/min. will waste about 10 cc if the dump valve closes only 0.5 seconds too late.

DESCRIPTION OF THE DRAWINGS

The above, as well as other advantages of the present invention will become readily apparent to those skilled in the art from the following detailed description of a preferred embodiment when considered in light of the accompanying drawings in which:

FIG. 5 is a schematic diagram of a robot mounted on a rail;

FIGS. 6-8 are schematic views showing the space saving effect of a limit switch assembly for a robot, whose arms are shown in extended and articulated positions;

DESCRIPTION OF THE PREFERRED EMBODIMENT

1. Bypass Arrangement for Paint Booth Robots

Figure 1:
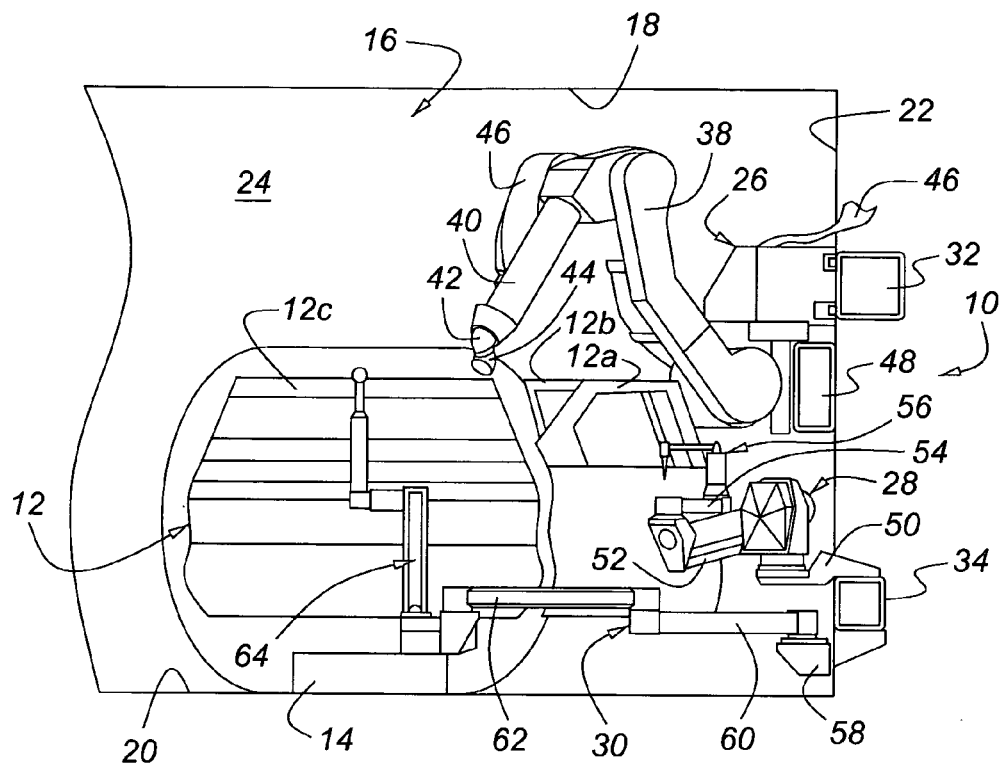
FIG. 1 is a front elevation view of a painting system in accordance with the present invention, including a paint robot and opener robots shown in extended positions, in a paint booth containing a vehicle body.

Referring now to FIG. 1, a robot bypass system in accordance with the present invention is indicated generally at 10. The system 10 illustrated is a painting system for painting a vehicle body 12 moving along a track or conveyor 14 in a paint booth 16. The paint booth 16 includes a roof 18 and a floor portion 20 connected by side walls 22 (only one is shown) to define an interior 24 thereof. The painting system 10 includes a paint robot 26, a door opener robot 28, and a hood/deck opener robot 30. The paint robot 26, door opener robot 28, and hood/deck opener robot 30 are each shown in an extended or operating position in FIG. 1. The paint robot 26 is mounted on an upper rail 32 attached to the sidewall 22 of the paint booth 16, although the rail 32 may be supported, instead, on a frame above the floor 20. The upper rail 32 is located near the roof 18 of the paint booth 16 and extends in a horizontal direction parallel to the conveyor 14. The paint robot 26 is slidably mounted on the upper rail 26 to allow the paint robot to move relative to the vehicle body 12 during operation of the system 10.

The door opener robot 28 and the hood/deck opener robot 30 are mounted on a lower rail 34 located near the floor 20 of the paint booth 16 and also attached to the side wall 22 or supported, instead, on a frame above the floor 20. The lower rail 34 extends in a horizontal direction parallel to the conveyor 14, and the door opener robot 28 and the hood/deck opener robot 30 are slidably mounted on the lower rail 34 to allow these robots to move relative to the vehicle body 12 during operation of the system 10.

The paint robot 26 includes a base portion 36 slidably attached to the upper rail 32 and being rotatable about a vertical first axis. An inner arm portion 38 is pivotally attached to the base portion 36 for rotation about a horizontal second axis. An outer arm portion 40 is pivotally attached to the inner arm portion 38 for rotation about a horizontal third axis. A wrist 42 is attached a free end of the outer arm portion 40 and has fourth and fifth axes of rotation. A paint applicator 44 is attached to the wrist 42 and preferably includes a bell applicator or the like (not shown). The paint robot 26, therefore, includes multiple (six including the sliding movement) degrees of freedom and is operable to articulate between an extended position, shown in FIG. 1, and a retracted position, not shown. A plurality of supply lines 46 provides colors of paint, air and solvent to the robot 26 and a process control enclosure 48 is attached to the base 36 for housing control wiring and equipment (not shown) for controlling the operation of the paint robot 26.

The door opener robot 28 includes a base portion 50 slidably attached to an upper portion of the lower rail 34 and a first arm portion 52 pivotally attached to the base portion 50 for rotation about a vertical first axis. A second arm portion 54 is pivotally attached to the first arm portion 52 for rotation about a vertical second axis. A door opener mechanism 56 is mounted at a free end of the second arm portion 54 for engaging and manipulating a front door 12a and/or a rear door 12b hinged to the vehicle body 12. The mechanism 56 is operable to grasp the vehicle doors 12a and/or 12b such that robot 28 can move the door into a position so that an interior and/or exterior surface thereof may be painted by the paint robot 26. The door opener robot 28 is operable to articulate between an extended position, shown in FIG. 1, and a retracted position, not shown.

The hood/deck opener robot 30 includes a base portion 58 slidably attached to a lower portion of the lower rail 34, and a first arm portion 60 pivotally attached to the base portion 58 for rotation about a vertical first axis. A second arm portion 62 is pivotally attached to the first arm portion 60 for rotation about a vertical second axis. A hood/deck manipulator 64 is mounted at a free end of the second arm portion 62 and has several movable arm portions operable to grasp a hood 12c or deck lid (not shown) of the vehicle 12 to move the hood and/or deck into a position so that an interior and/or exterior surface thereof may be painted by the paint robot 26. The hood/deck opener robot 30, therefore, includes multiple degrees of freedom and is operable to articulate between an extended position, shown in FIG. 1, and a retracted position, not shown.

The robotic painting system 10 shown in FIG. 1 permits each of the robots 26, 28 and 30 to move past the other ones of these robots when necessary. In addition, when the robots 26, 28 and 30 are retracted toward the side wall 22, the vehicle body 12 can be moved past the robots on the conveyor 14 while the doors 12a and 12b, hood 12c and deck lid 12d are open. Although not shown, a duplicate of the painting system 10 is provided on the opposite side of the conveyor 14 for painting the passenger side of the vehicle body 12.

Figure 2:
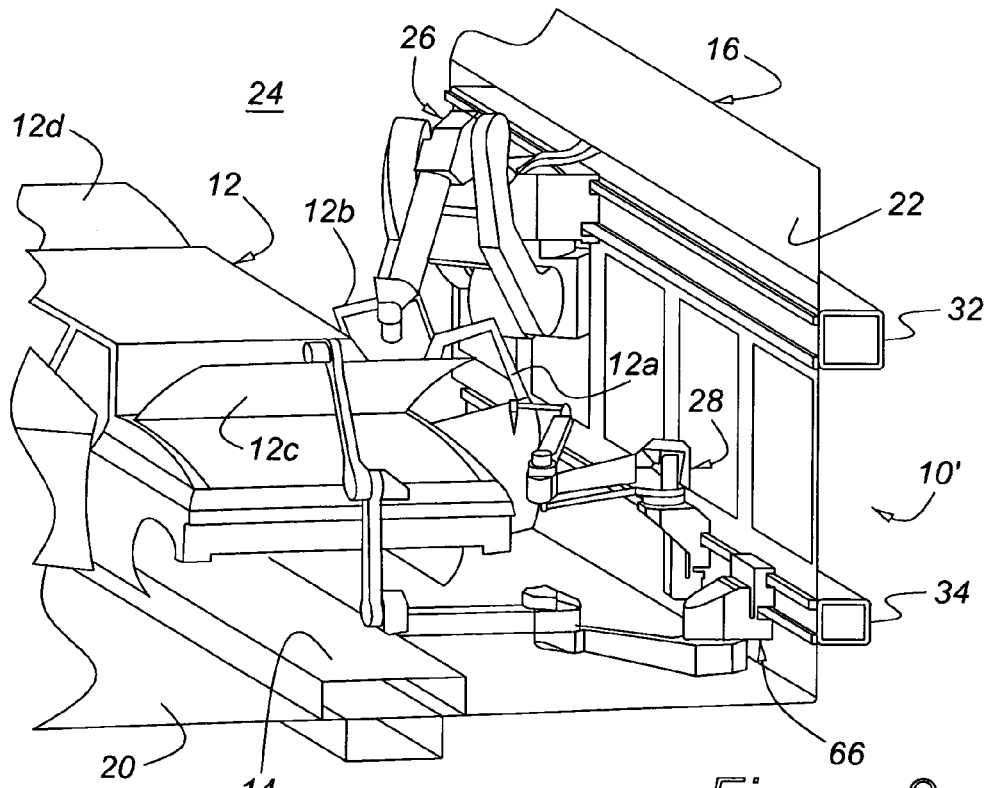
FIG. 2 is a perspective view of the painting system shown in FIG. 1 with an alternate embodiment of hood/deck opener robot.

Referring now to FIG. 2, an alternate embodiment painting system 10' is shown with the paint robot 26, the door opener robot 28, and a hood/deck opener robot 66. The robot 66 is similar to the robot 30 of FIG. 1 except that it is slidably mounted on the same upper portion of the lower rail 34 as is the door opener robot 28 for painting operations where the 28 and 66 are not required to move past each other.

Although the system 10 is described in terms of a vehicle body painting system, it can be used to perform other operations wherein it is desirable for robots to bypass one another.

2. Painting Booth Safety Zone Limit Switching

Referring now to FIGS. 3 through 10D, a robot in accordance with the present invention is indicated schematically at 100. The robot 100 is mounted on a base portion or carriage 102, and it rotates on the carriage 102 about a waist axis. The robot 100 is adapted to be mounted on a longitudinal rail 106 located beside the conveyor 14 and is operable to move along axis 108, which is substantially parallel to a longitudinal axis of the rail 106. At least one robot arm 110 extends outwardly from the robot 100 and includes a robot wrist 112 and a tool 114, such as a rotary paint atomizer or the like, on a free end of the arm. The robot 100 includes a cam 116, formed on a radially outer edge and secured to the base of the robot for rotation on the carriage about the waist axis. The cam 116 engages a limit switch lever 118, which pivots about a pivot support 120 as the cam and robot rotate. A spring 122 biases the lever into engagement with the cam 116. A limit switch 124, located adjacent the free end of the lever 118, is connected to an electronic control system, which control operation of the robot 100 including control of a braking system that stops movement of the robot along the rail 108 and rotation about the waist axis.

The profile of the cam 116 on the robot 100 is such that when the robot 100 rotates counterclockwise about the waist axis, the cam 116 rotates counterclockwise about the axis, the lever 118 follows the cam and rotates counterclockwise about the point 120 compressing the spring 122 and engaging the limit switch 124. The limit switch 124 is actuated to send a signal to the control system, which produces an output signal that stops translational and rotational displacement of the robot 100. The profile of the cam 116 is selected such that the limit switch 124 is actuated by the lever 118 when an outer surface of the tool 114 enters an emergency stopping zone, indicated by an arrow 126 adjacent a safety zone, indicated by a line 128. By stopping operation of the robot 100 when the tool 114 enters the emergency-stopping zone 126, the tool will continue into the zone 126 but will decelerate to a stop before entering the safety zone 128. Thus, the limit switch 124 stops operation of the robot 100 if the robot 100 is at the emergency-stopping zone 126, regardless of the angular position of the robot. This arrangement allows the rail 106 and painting booth to be of a shorter overall length than would otherwise be required, thereby decreasing the cost of the rail 106 and booth. A stop bracket 130 prevents the carriage 102 from moving along axis 108 into either of the zones 126 or 128.

Figure 3:
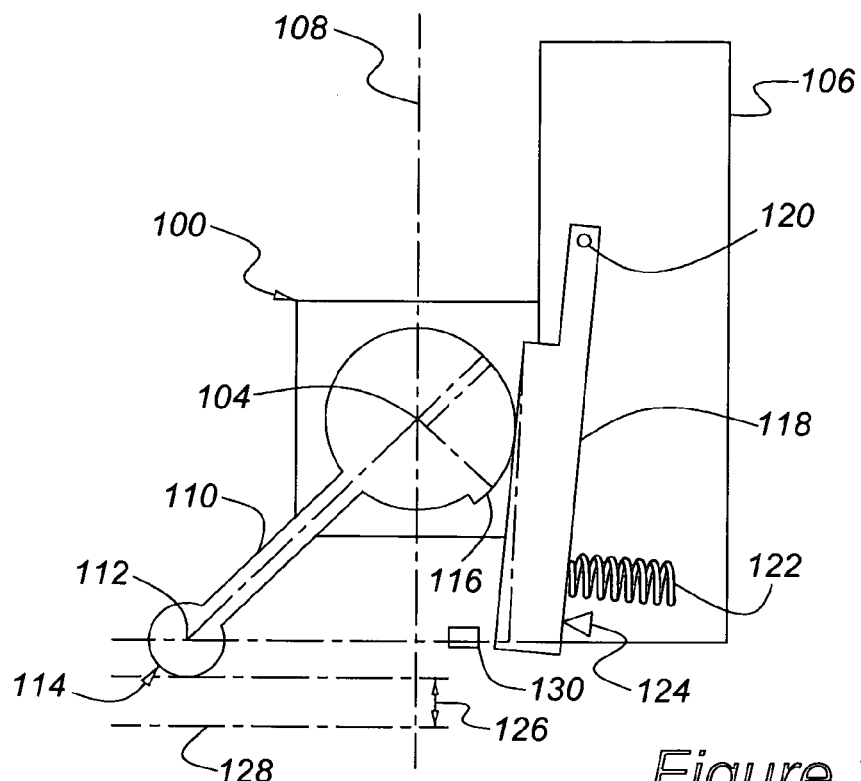
FIG. 3 is a schematic top view of a limit switch arrangement for a robot supported on a rail.
Figure 4:
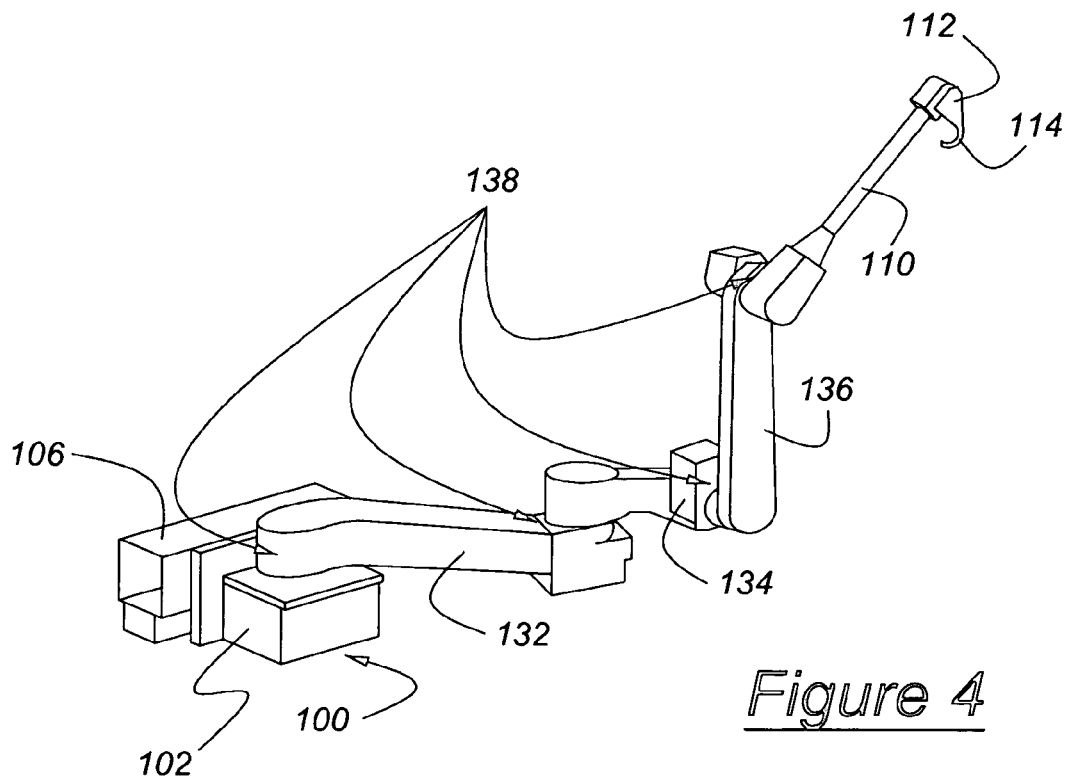
FIG. 4 is perspective view of a robot having multiple links.

As best seen in FIG. 4, the robot 100 may include multiple rotary links: an inner arm 132 extending from and rotating on the carriage 102, an outer arm 134 extending from and rotating on the inner arm 132, a third arm 136 extending from and rotating on the outer arm 134, and robot arm 110 extending from and rotating on the third arm 136. The inner arm 132, the outer arm 134, and the third arm 136 each includes a cam 116, lever 118 and limit switch 124, which are organized in the form of an limit switch assembly 138 located at each articulating joint of the arm, as shown in FIG. 3. The limit switch assemblies 138 are preferably connected in series, provide feedback to the control system, and stop operation of the robot 100 when either the inner arm 132, the outer arm 134 or the third arm 136 enters the emergency stopping zone 126. In addition, if the robot 100 includes any other type of links, those links also may include a limit switch assembly 138. As is best seen in FIGS. 5-8, by incorporating feedback from the inner arm 132, outer arm 134, and third arm 136, the effective length of the rail 106 may be decreased by a distance, indicated by the arrow 140 in FIGS. 7 and 8. The length of arrow 140 is equal to the difference between a distance R2 and a distance R1. The distance R2 is substantially equal to the range of motion of the arms 132, 134, 136, and 110, or any combination of robot arms.

FIG. 5 illustrates robot arms 110, 132 extended in alignment with the rail 106 to the limit of the robot's travel along the rail before entering the safety zone at 128, but without use of a switch assembly 138. The distance from the waist axis to the safety zone 128 is R2. The wasted rail and paint booth lengths are indicated.

FIG. 6 illustrates arm 132 articulated about the waist axis on the carriage 102, arm 110 aligned with the rail 106, its tool located at the boundary of the safety zone 128, with use of a switch assembly 138. The distance from the waist axis to the safety zone 128 is R1, a shorter distance than R2.

FIGS. 7 and 8 illustrate the length of the reduced rail length and booth length 140 when the switch assemblies 138 are used for condition when the robot arm is reaching backward and reaching forward, respectively.

Figure 9:
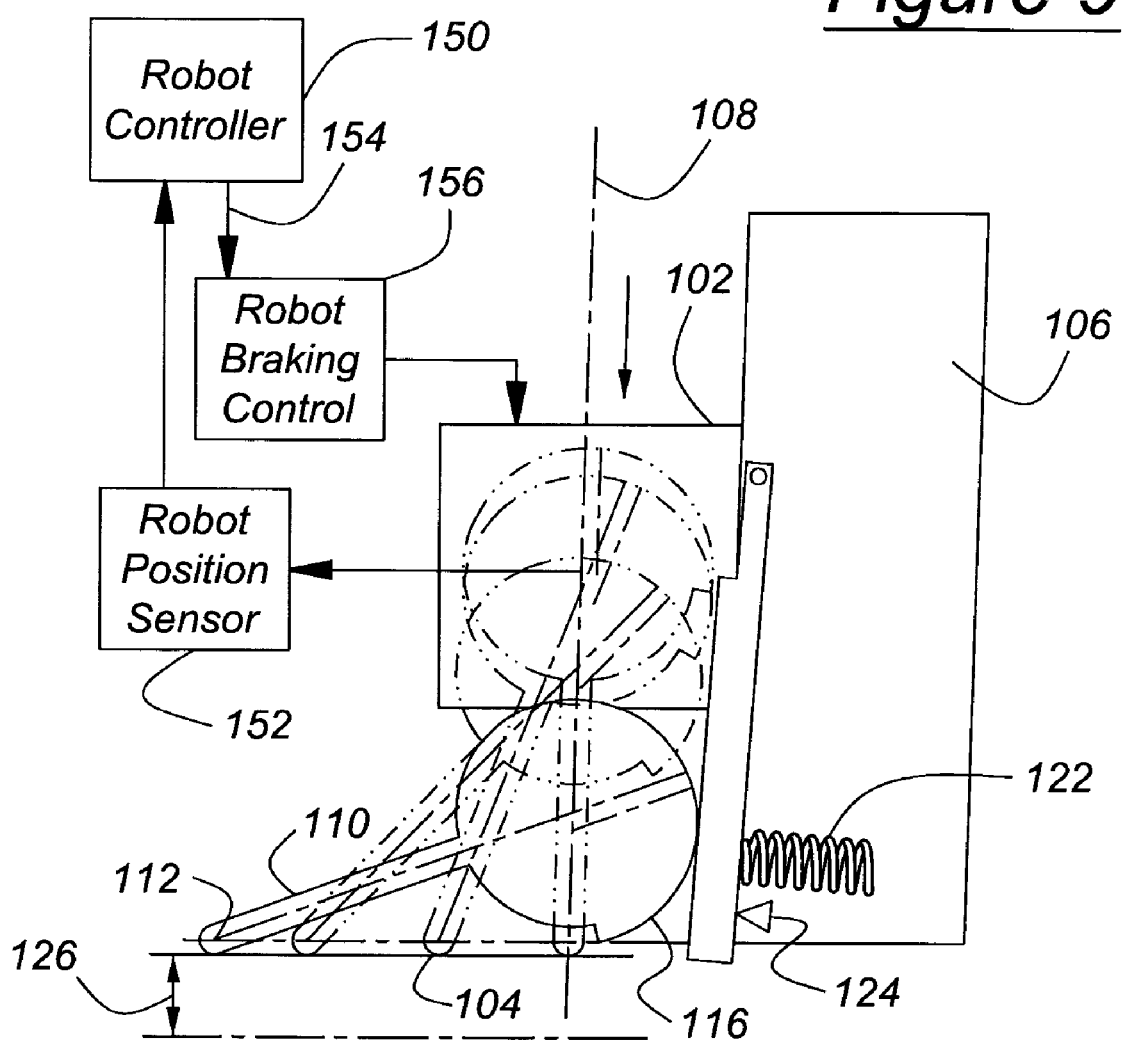
FIG. 9 is a schematic top view showing the effect of a limit switch arrangement installed on a robot supported on a rail in a paint booth.
Figure 10A:
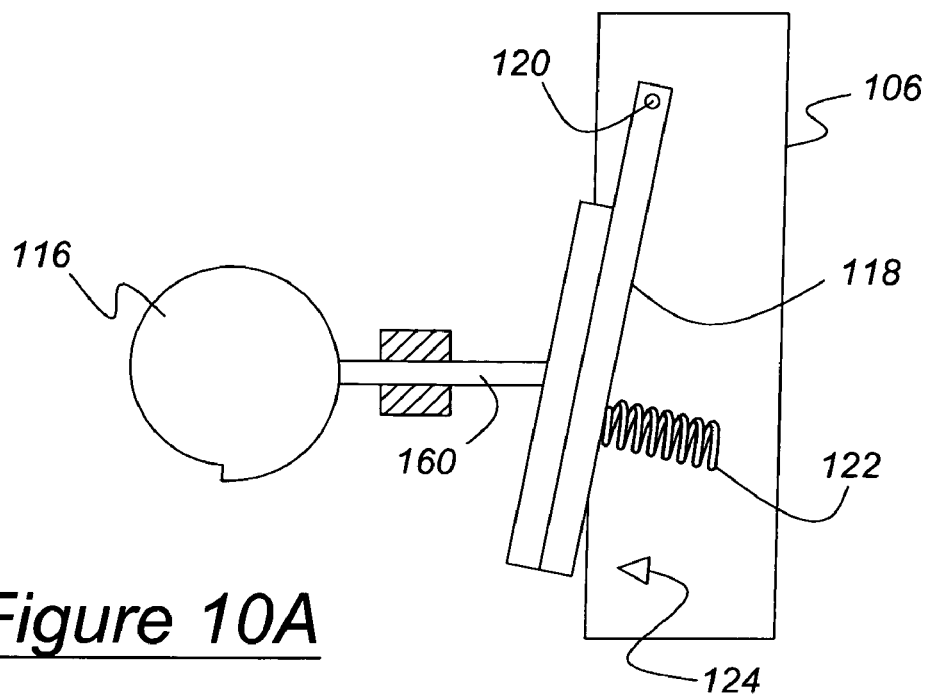
FIGS. 10A-10D are alternate forms of a cam, cam follower, and limit switch assembly.
Figure 10B:
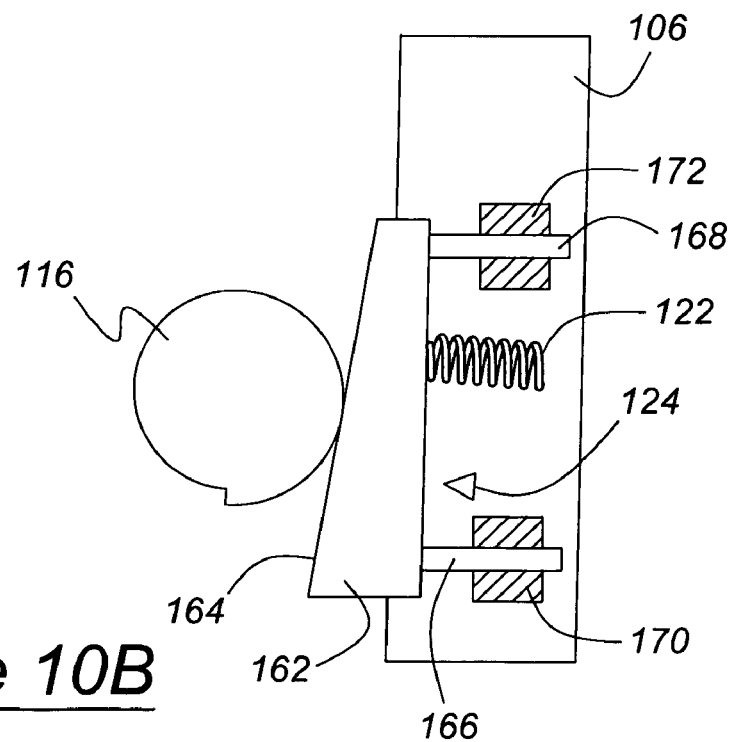
Figure 10C:
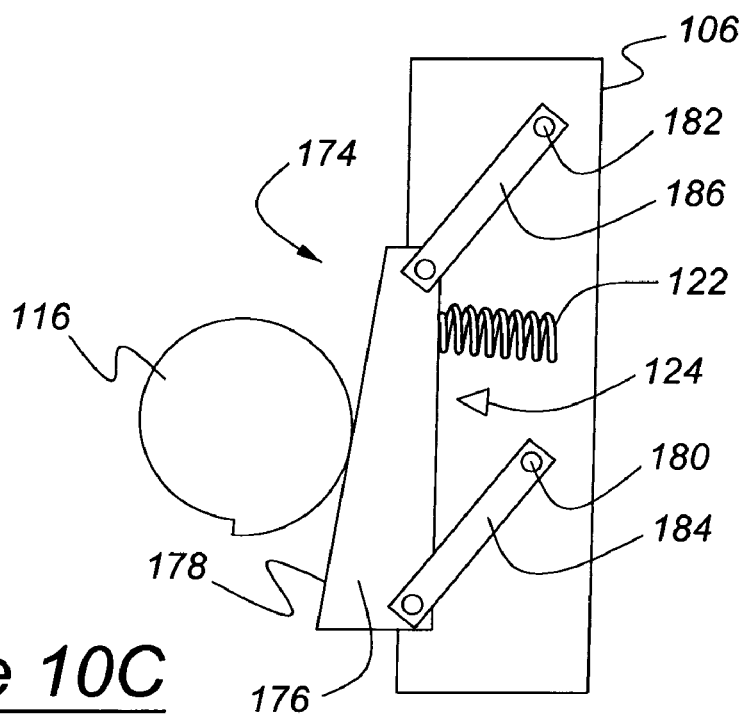
Figure 10D:
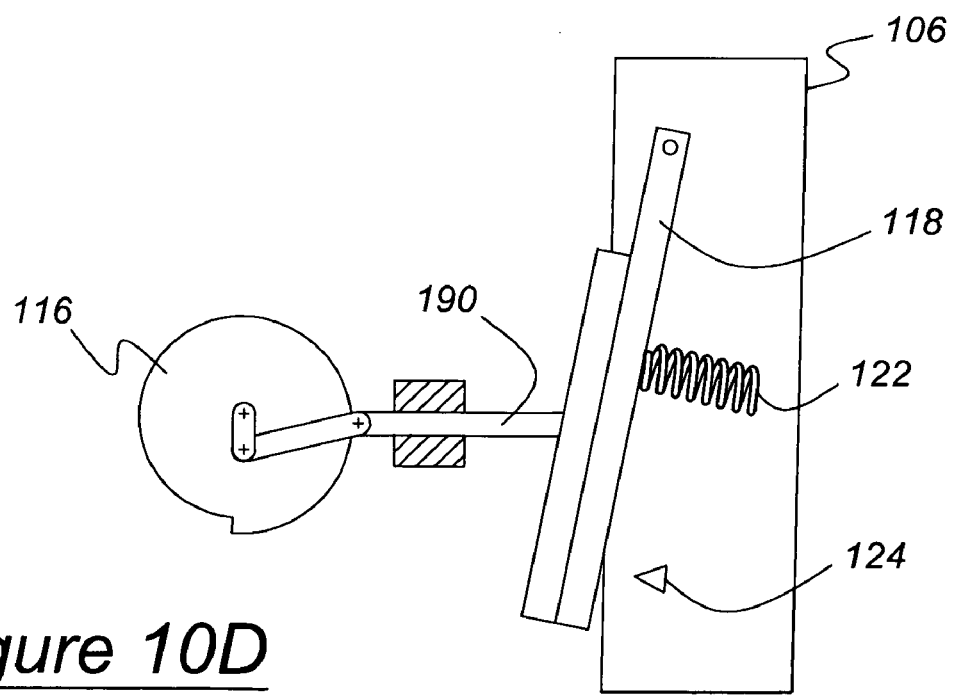

As FIG. 9 shows, as the robot arm 110 becomes increasingly aligned with axis 108, the limit switch 124 is actuated to stop robot movement when the robot is at progressively greater distances from the end of the rail 106 in order to prevent the end of the robot arm 110 from entering the safety zone at 128. But as the robot arm 110 becomes increasingly articulated out of alignment with axis 108, the limit switch 124 is actuated when the robot is progressively closer to the end of the rail 106 and before end of the robot arm 110 enter the safety zone at 128. Therefore, to the extent that the robot arm is extended laterally away from the rail 106 and toward the article being processed in the paint booth, the rail's length and the paint booth's length can be reduced by using the limit switch assembly 138 of this invention.

FIG. 9 further shows the robot 100 supported by carriage 102 on rail 106 for movement along axis 108. The robot arm 110 is shown in various angular positions about the waist axis, where a controller 150 will have stopped operation of the robot when an outer surface of the tool 114 enters the emergency stopping zone 126 and before the tool enters the adjacent safety zone 128. A robot position sensor 152 produces input signals at frequent, timed intervals to the controller 150 representing the current longitudinal position of the waist axis on axis 108 from a reference position and the angular position of arm 110 about the waist axis from a second reference angular position.

A control algorithm expressed in computer coded software, which is stored in electronic memory accessible to the controller 150, is repeatedly executed by the controller 150 at frequent intervals using as input the signals produced by sensor 152. Using this information, the controller determines the speed, direction of movement, acceleration, and current axial position of the tool 114 relative to the emergency stopping zone 126. The algorithm produces an output signal 154, which issues from the controller 100 as input to a robot braking system controller 156, which stops operation of the robot 100 when an outer surface of the tool 114 enters the emergency stopping zone 126 and before the tool 114 enters the adjacent safety zone 128.

Other means for engaging the limit switch 124 with the movement of the cam 116 will be appreciated by those skilled in the art while not departing from the scope of the present invention. For example, a straight connecting rod 160, whose opposite ends contact the cam 116 and lever 118, respectively, converts cam rotation to lever pivoting, thereby allowing the robot to be laterally spaced from the rail 106. Or a 162 having a tapered surface 164 may contact and follow the cam 116, transmitting cam movement to spaced rods 166, 168, which slide in guides 170, 172 instead of pivoting a lever. Or a four bar linkage 174 may hold a follower 176 having a tapered surface 178 in contact with the cam 116 as the linkage pivots on two fixed, pivot centers 180, 182 at the end of two of the bars 184, 186 of the linkage 174. The cam may be connected eccentric of its center of rotation to a link 190 that reciprocates as the cam 116 rotates, thereby converting cam rotation to lateral displacement of the link 190, which is applied to the lever 118 causing it to pivot. These alternate arrangements are shown, respectively in FIGS. 10A-10D.

3. Delivering Multi-Component Conductive Paints to Electrostatic Applicator

Figure 11:
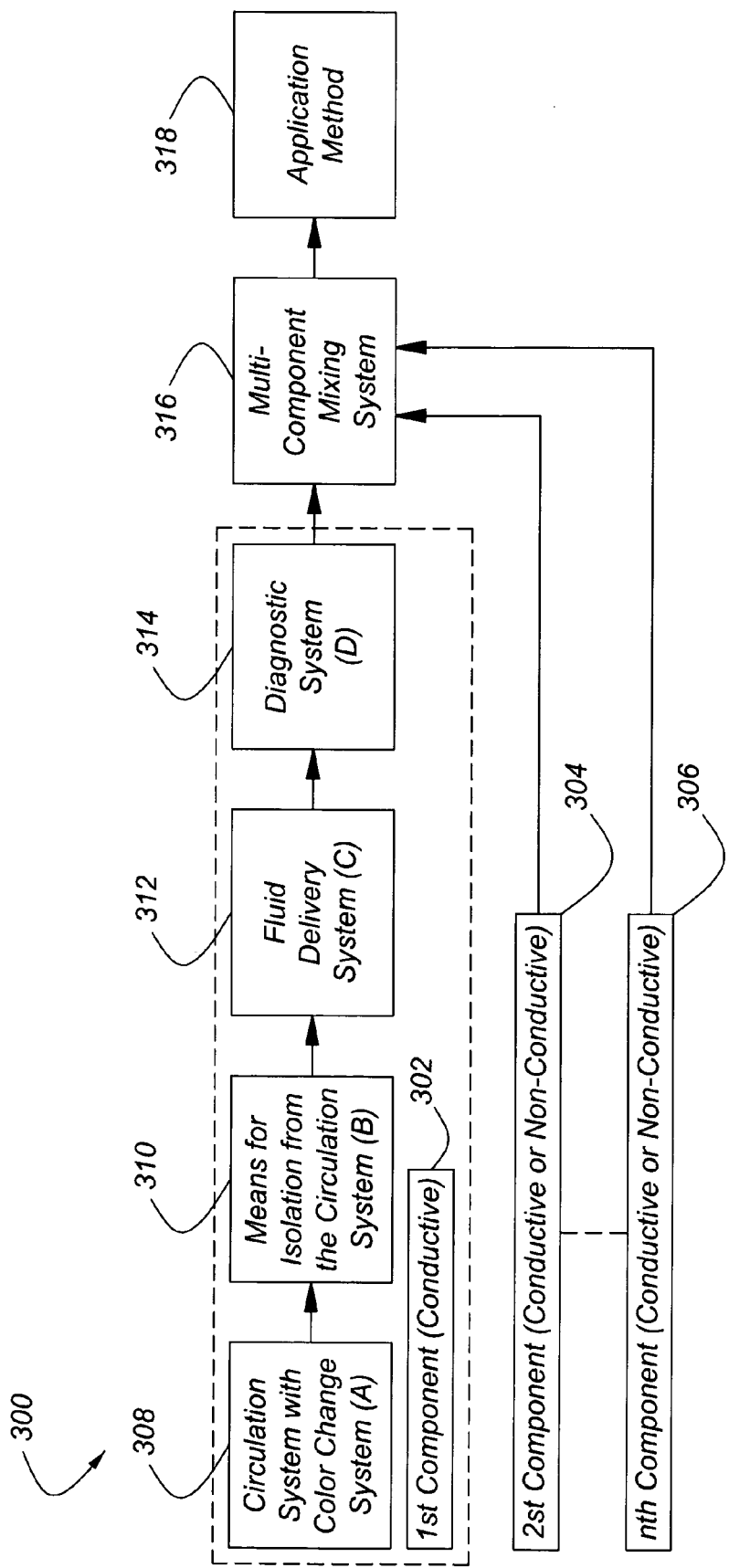
FIG. 11 is a block diagram of an apparatus for isolating the conductive component of paint from the nonconductive component before mixing them.

Referring now to FIG. 11, a system and a method for delivering conductive paints electrostatically is indicated in block diagram form at 300. The system 300 includes a first paint component 302 and at least one second paint component 304. The system 300 may also include additional paint components up to an "$n^{th}$" paint component 306. preferably, the first paint component 302 is a conductive component, and the second paint component 304 through "$n^{th}$" paint component 306 may be either conductive or nonconductive. The system 300 also includes a circulation system with a color change system 308, a means for electrically isolating the circulation system 310, a fluid delivery system 312, and a diagnostic system 314. The portion of the painting system 300 that includes the first paint component 302, the second paint component 304, and the "$n^{th}$" paint component 306 is in communication with a multi-component mixing system 316, which is in communication with the paint applicator and application method 318.

The apparatus for isolating the circulation system 310 the fluid delivery system 312 and diagnostic system 314 from the circulation system 308 is are described and shown in the U.S. patent application Ser. No. 10/004,936, filed Dec. 5, 2001, which is assigned to the Assignee of the present invention. The entire disclosure of U.S. patent application Ser. No. 10/004,936 is incorporated herein by reference. The apparatus and method disclosed in the referenced patent application comprise a first embodiment of the present invention. The apparatus in that patent application can also be duplicated such that two painting systems are run in parallel, a second embodiment of the present invention. The first system is prepared for the next color while the second system is changing the current color. This will allow for a continuous or batch delivery of paint—virtually eliminating the time required either to refill a paint canister or to clean and fill the canister with a second color paint.

Figure 12:
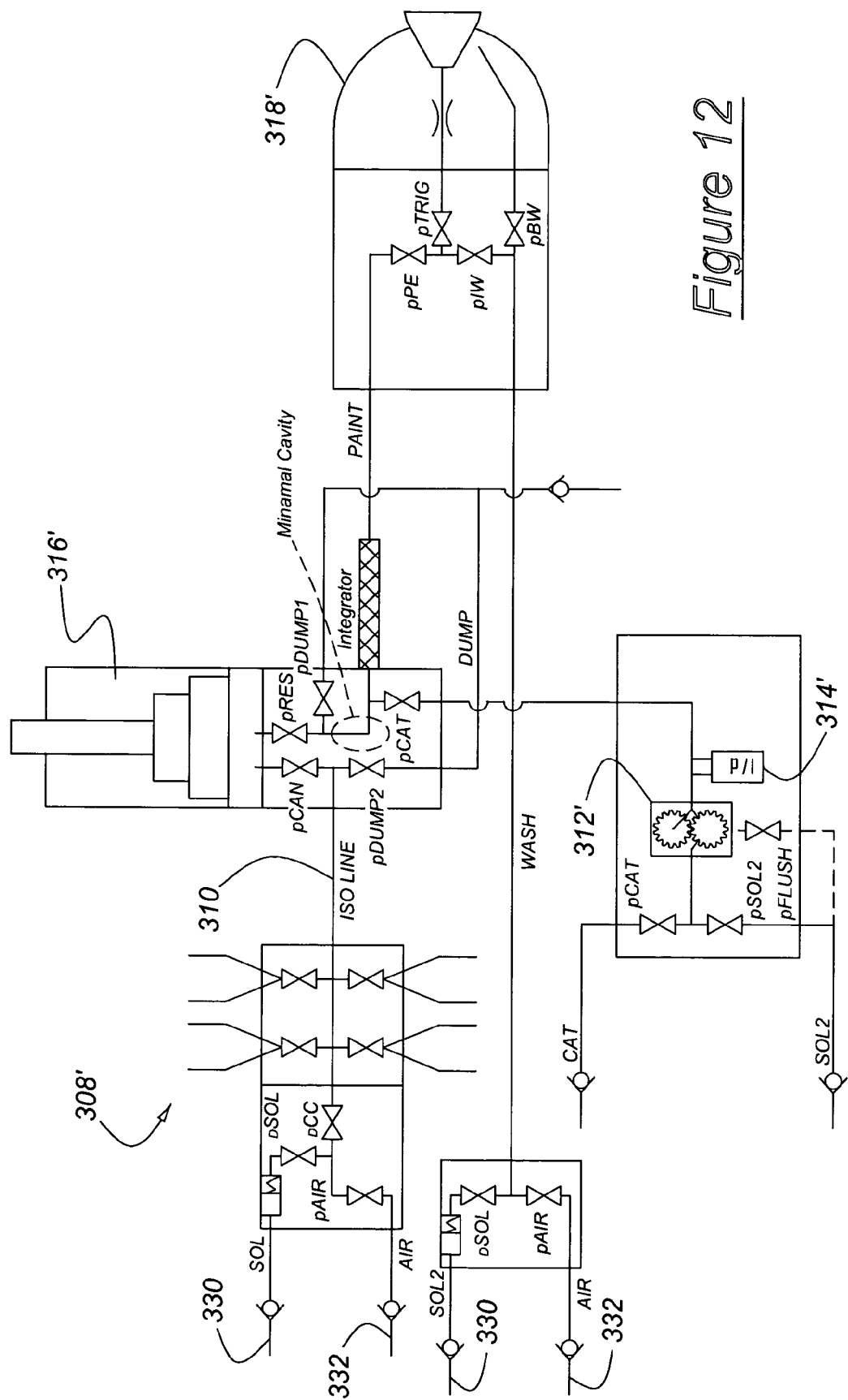
FIG. 12 is schematic diagram of a paint delivery circuit.

In FIG. 12, there is shown a third embodiment of the present invention for isolating the conductive components. The circulation system 308, which includes a color change system, is connected to a source of solvent 330 and a source of pressurized air 332. The circulation system 308 communicates through an electrically isolated line 310' to the component mixing system 316', which can be a static mixing tube or another device used in multi-component delivery systems. A canister isolation system is used for the nonconductive material, such as resin. If a non-conductive component is used for one of the materials, a more traditional means such as a gear pump or flowmeter 312' can be used to deliver that fluid to the multi-component mixing system 316'.

The mixed material can be applied by any direct charge electrostatic paint applicator 318', such as a rotary atomizer, where the paint and/or applicator are charged (electrostatics), or an electrostatic gun applicator.

pressure transducers 314', which can be used for the diagnostic system as optional components, sense high and low pressure conditions in the system 300 and identify an off-ratio condition. There is no need to isolate from the circulation system. The diagnostic system 314', which senses high or low pressure conditions in the system 300, or to identify an off-ratio condition, is an optional component of this system.

Figure 13:
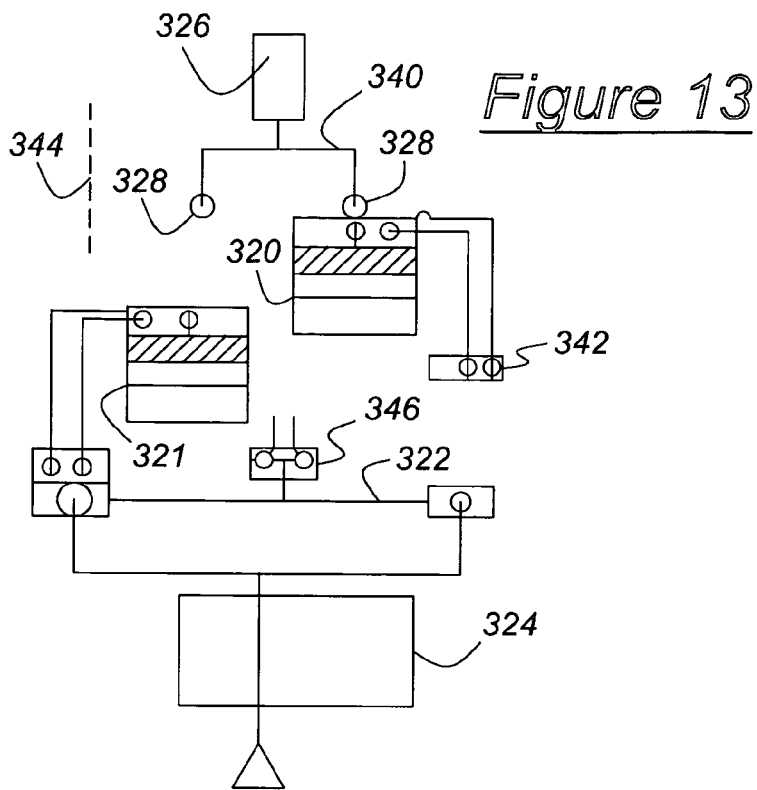
FIG. 13 is a schematic diagram of a paint delivery circuit.

There is shown in FIG. 13 a fourth embodiment of the present invention for isolating the waterborne or substantially conductive component when only the waterborne or substantially conductive material is provided and no second component is added. This is a batch painting system.

The paint circulation system 308 delivers paint to a color valve stack. Different colors of paint are supplied to a color changer 326, which delivers the paint to a pair of paint valves 328, one of which supplies paint to one of the canisters 320, 321. A pair of canisters 320, 321 alternately supplies paint through an isolation manifold 322 to a robot-mounted applicator 324. Canister 320 is shown in a filling position where paint is delivered to canister 320 through valve 328 at a docking station. Canister 321 is shown in its painting position. Each canister consists of a stainless steel canister sleeve, canister body, piston, ram, ball screw, motor, and drive frame. The painting canister 321 must be suitably undocked from the docking station to allow electrostatic isolation. This requires an additional pair of air cylinders and guides. When canister 321 undocks from its paint valve, it engages isolation manifold 322, which carries paint to the robot and paint applicator 324.

During painting, the applicator 324 and the paint line from the applicator 324 back to the painting canister 321 are charged. The painting canister 321 is isolated from its environment by air space, and from its drive mechanism by petticoats and seals. The charged paint line is an "isocore" or similar insulated line. The filling canister 320 is grounded and isolated from the painting system by air space.

To substitute a new canister containing the same color paint, the following procedure is used. The cycle starts with canister 320 in the docking station full of paint, and separated by an air gap from isolation manifold 322. Canister 321, which has just completed supplying paint to applicator 324, is essentially empty. Cascade powers down. A switching mechanism docks canister 321 and undocks canister 320. Cascade powers up. painting may begin as soon as the electrostatic system is energized. Canister 321 continues to fill while canister 320 is painting.

To substitute a new canister containing different color paint the following procedure is used. The cycle starts with canister 320 in the docking station full of paint. Canister 321 has just completed painting, and is essentially empty. Cascade powers down. A switching mechanism docks canister 321 and undocks canister 320. Canister 321 executes a clean cycle by flushing the color changer 326, fill line 340, and the line from canister 321 to outboard valve 342 using solvent from color changer 326. The flush path is through canister 321 and back through dump to a drain 344. Meanwhile, cascade powers up and canister 320 dispenses paint. When the canister 320 has completed painting, the cascade powers down. The switching mechanism docks canister 320, and canister 321 remains in dock. Canister 320 executes a clean cycle, as described above for canister 321. Concurrently, the solvair valve 346 supplies solvent to the isolation manifold 322 and applicator supply lines, thereby flushing paint out through applicator 324. When the clean cycle is complete, solvair blows its line dry and pressurizes the line for electric isolation. When the cleaning cycle at the docking station is complete, canister 321 fills with the new color paint. The switching mechanism undocks canister 321, and painting begins as soon as the electrostatic system is energized. Canister 320 fills with the new color while canister 321 paints.

4. Supporting Painting Utility Lines on Articulating Robot Arm paint hose life is important to the performance and reliability of the paint system. paint line failures are costly and time consuming to repair. This invention ensures proper life of the paint lines, uses a proven clamping technique, and employs low cost parts.

Referring now to—FIG. 14-18, a robot in accordance with the present invention is indicated generally at 400. The robot 400 includes a lower arm 402, pivotally attached to a carriage portion 404, and an upper arm 406, pivotally attached to the lower arm 402. A bundle 408 of elongated tubes, containing electric lines, hoses, tubes, and cables, is attached to the carriage portion 404 by a lower clamp member 410.

Figure 18:
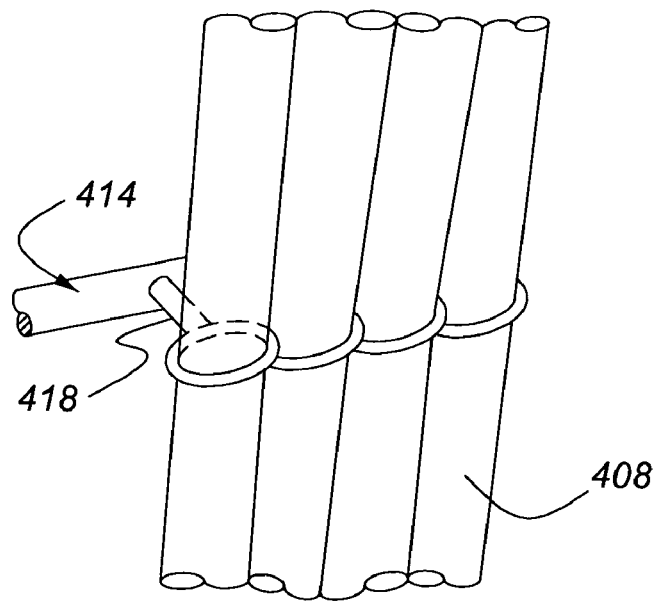
FIG. 18 is a perspective view of the separator/control bar shown in FIG. 14.

The tube bundle 408 carries, for example, electrical power lines, paint lines, compressed air passages, and solvent lines to a tool attached at an end of the upper arm 406 of the robot. An upper clamp member 412 attaches the bundle 408 to the lower arm 402. The bundle 408 is gathered and held in the form of a ribbon of tubes between the upper clamp member 412 and the lower clamp member 410 by a separator/control bar 414. As FIG. 18 shows, the bar 414 is formed with holes spaced along its length, each hole containing the threaded shank of an eyebolt 418, whose eye or ring is fitted with a tube of the bundle 408, thereby engaging each of the tubes of the bundle 408 and holding them in a single row along the length of the bar 414.

Figure 14:
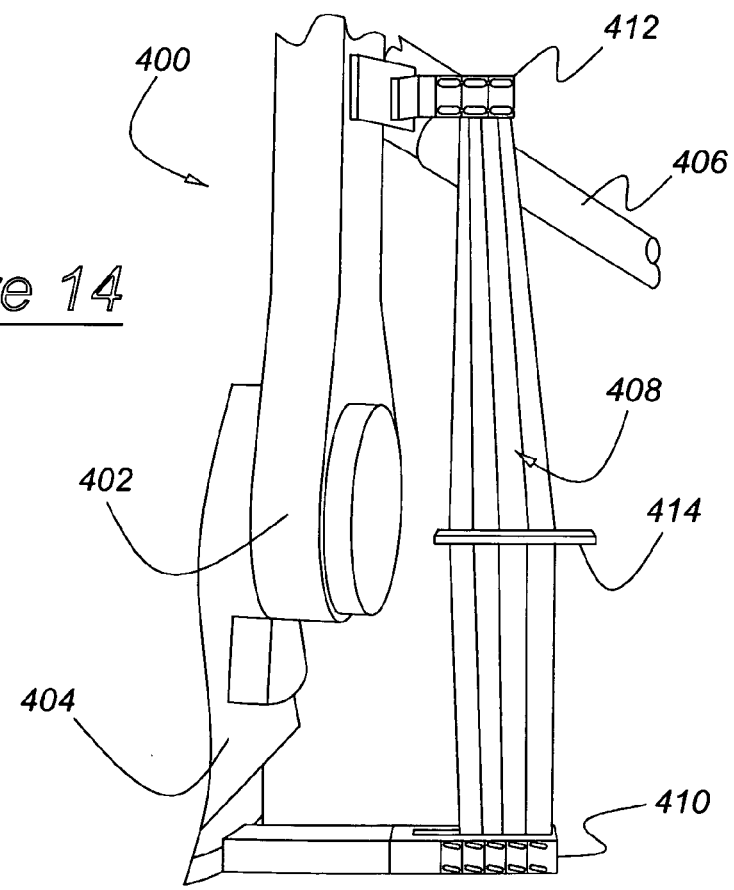
FIG. 14 is perspective view of an apparatus for routing paint utility conduits across an articulating joint on a robot arm.
Figure 15:
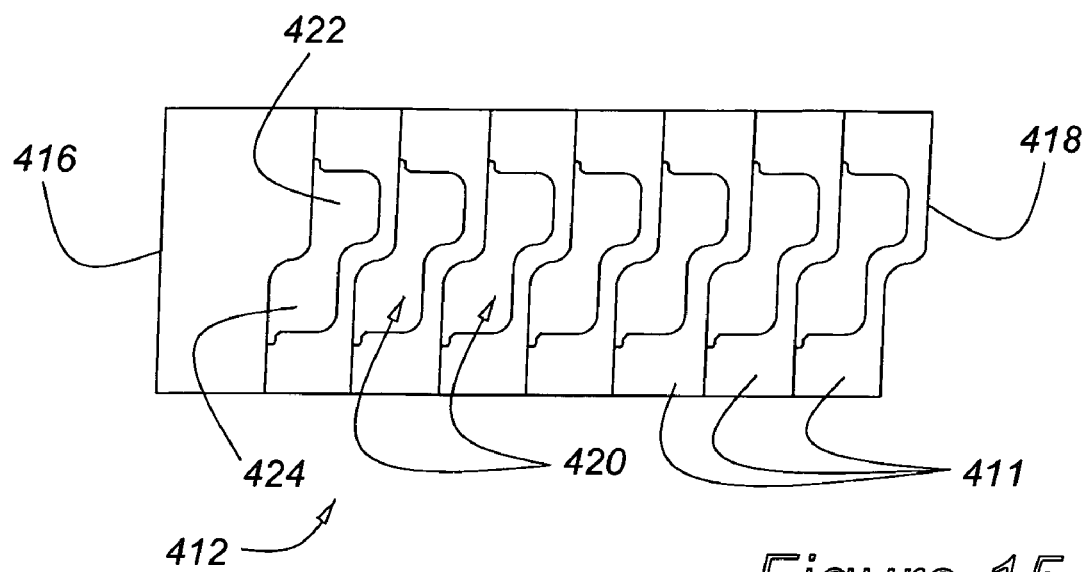
FIG. 15 is a schematic view of a staggered clamp for the conduits of FIG. 14.
Figure 16:
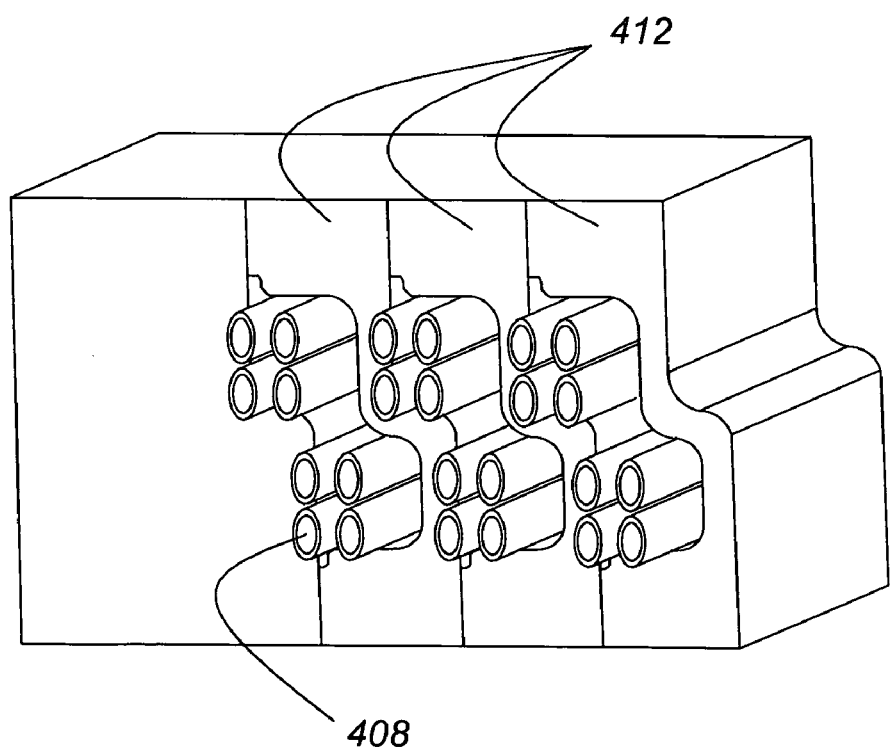
FIG. 16 is a perspective view of the staggered clamp shown in FIG. 15.

As is best seen in FIG. 14, the upper clamp member 412 is formed of a series of clamps 411 arranged in a stack of mechanically connected clamps, member 412 having a first end 416, a second end 418, and a plurality of apertures 420 through the thickness of the clamps 411 arranged in an upper row 422 and a lower row 424. The apertures 420 in the lower row of the upper clamp member 412 are staggered by substantially one half pitch with respect to the apertures 420 in the upper row of the upper clamp member 412. The upper and lower rows of the upper clamp member 412 reduce the width of the clamp member 412. FIG. 16 shows the tubes of the bundle 408 passing through the upper clamp member 412 in a staggered arrangement.

The separator/control bar 414 holds the tubes of the bundle 408 in a ribbon of tubes arranged side-by-side, thereby preventing the bundle 408 from "bird caging" (wherein the lines bow outwardly in different directions) and requiring the individual hoses, tubes, and cables of the bundle 408 to move as a unit, which stabilizes the bundle 408 and prevents erratic movements of the bundle 408. The separator/control bar 414 causes the tubes of the bundle 408 to transition from the staggered rows at the upper clamp member 412 to a wider array of tubes at the separator/control bar 414. This arrangement of tubes in the ribbon configuration allows the individual hoses, tubes, and cables of the bundle 408 to bend on the neutral axis.

Figure 17:
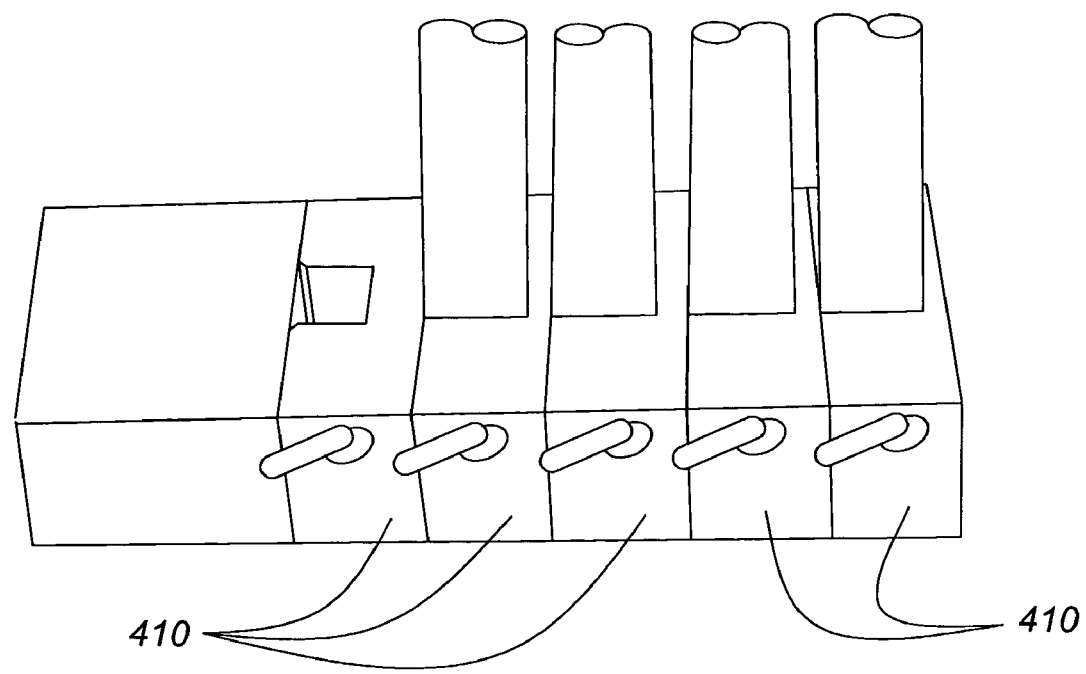
FIG. 17 is a perspective view of a lower clamp of FIG. 14.

As is best seen in FIG. 17, the lower clamp member 410 is formed of a series of clamps 426 arranged in a stack of mechanically connected clamps, member 410 having a first end 428, a second end 430, and a plurality of apertures 432 through the thickness of the clamps 426, the apertures 432 being arranged in a single row. The apertures 432 are preferably equally spaced and allow the tubes of the bundle 408 to extend laterally the full width of the ribbon.

The combination of the lower clamp member 410, the separator/control bar 414, and the upper clamp member 412 allows the hoses, tubes, and cables of the bundle 408 to flex more naturally during movement of the robot 400, thereby increasing the life of each of the tubes of the bundle 408.

Alternatively, the lower clamp member 410 may be replaced with the upper clamp member 412, such that the tubes are in staggered rows also at the lower end of the bundle.

5. Priming a Painting Circuit for Automatic Painting Equipment

Some systems for priming a painting circuit of automatic equipment use a dump circuit, i.e., passages used to carry cleaning solvents and waste paint from the system, as a means for venting existing air. In such a system, the dump valve must he closed at precisely the right time in the process to gain the maximum benefit of venting all the air in the system, while keeping paint from being wasted through the dump passage. At the high flow rates desired for rapid color changing, inaccurate timing of even a fraction of a second can result in unacceptably high waste volumes of paint.

Figure 19:
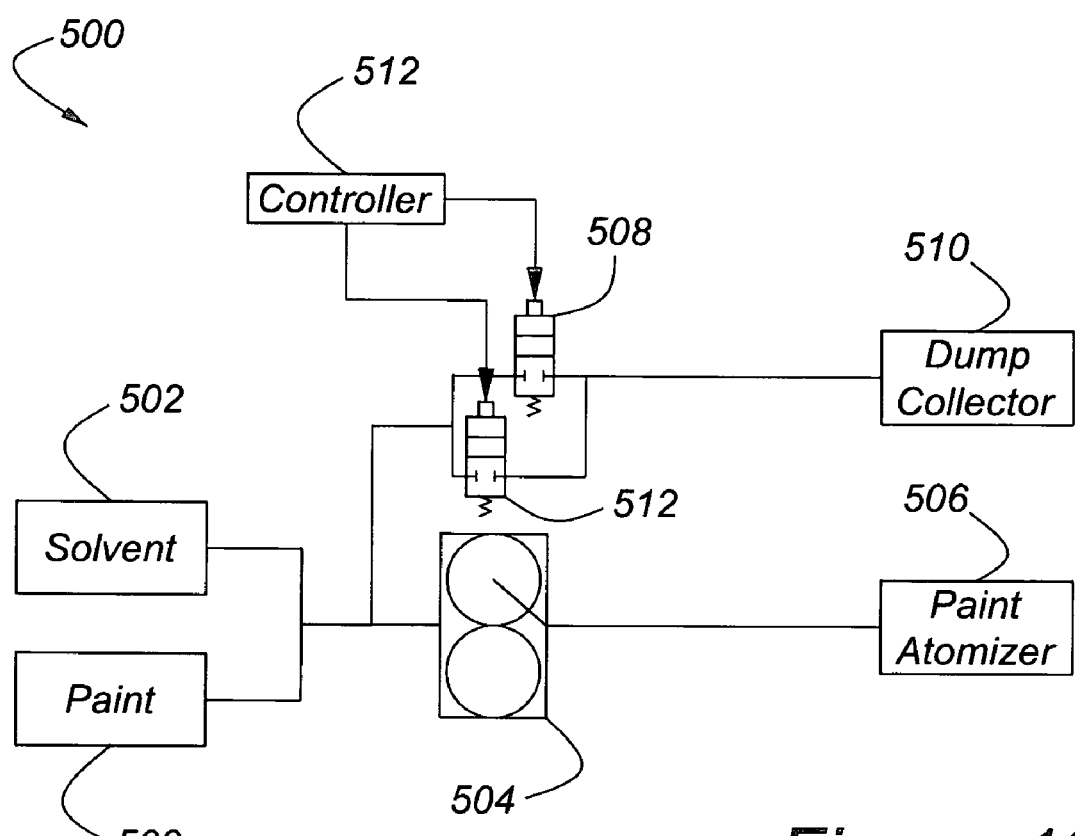
FIG. 19 is a schematic diagram of a paint delivery circuit including a dump valve and vent valve.

In the method disclosed here for priming a painting circuit of automatic equipment, the problem of precise timing is solved by adding a parallel, but somewhat restrictive circuit controlled by a second valve, the vent valve. This second passage is substantially smaller than the main passage of the dump circuit, perhaps 0.3 mm in diameter compared to the 6 or 7 mm diameter dump passage. Because of the viscosity difference between the air being vented and the paint being introduced into the system, the small vent line does not restrict the flow of air, but it greatly inhibits the flow of paint. Thus, paint can be introduced into the system rapidly, but its flow will suddenly be reduced when the paint reaches the very small paint line. In one example, a small 0.5 mm diameter line, 100 mm long would allow a paint flow of only 6-3 cc/mm when supply pressure is 140 psi. In this case, an unfavorable error in valve timing of 0.5 seconds would result in the waste of only 0.053 cc of paint Referring now to FIG. 19, a painting circuit for automatic equipment is indicated generally at 500. The painting circuit 500 includes a paint source 502 in fluid communication with an inlet to a fluid pump 504, preferably a gear pump. An outlet of the pump 504 is in fluid communication with a paint atomizer, indicated schematically at 506. The paint supply 502 is also in fluid communication with an inlet of a dump valve 508. An outlet of the dump valve 508 is in fluid communication with a dump collector 510. The paint supply 502 is also in fluid communication with a vent valve 512. An outlet of the vent valve 512 is also in fluid communication with the dump collector 510. The dump valve 508 and the vent valve 512, therefore, are connected in parallel between the paint supply 502 and the dump collection 510. The paint pump 504, the paint atomizer 506, the dump valve 508, and the vent valve 512 are in communication with an electronic controller 514.

The passages through the vent valve 512 and associated fluid lines are of a substantially smaller diameter than the diameter of the dump valve 508 and its associated fluid lines. The dump valve 508 is opened during a cleaning operation and is used to carry cleaning solvents and waste paint away from the paint atomizer 506 and the associated lines of the painting circuit 500.

The vent valve 512 is used during a paint color change operation after the paint atomizer 506 and the painting circuit 500 have been cleaned and the cleaning solvent and waste paint have been routed to the dump collection 510 through valve 508. During a paint color change operation, the lines of the painting circuit 500 are filled with a paint of a new color, but trapped air in the painting circuit 500 must be vented before using of the paint atomizer 506. This action ensures that the painting circuit 500 and the paint atomizer 506 are primed properly, which ensures proper operation of the painting circuit 500 and the paint atomizer 506. During the paint color change operation, the controller verifies that the dump valve 508 is closed, and it opens the vent valve 512 to allow trapped air to escape from the painting circuit 500 and to be routed to the dump collection 510. Because the vent valve 512 and its associated lines are of a substantially smaller diameter than the diameter of the dump valve 508 and its associated lines, the volume of paint that may be lost while priming of the painting circuit 500 is small. Upon completion of the paint color change operation, the controller closes the vent valve 512, and the painting circuit 500 and paint atomizer 506 are operated normally.

The system is passive. Therefore, it requires no sensors or control logic other than timing, and it is well suited to automated painting where equipment must often operate in hazardous environments. Because the system includes the larger dump passage in parallel with the vent passage, the large, unrestrictive passage is available to carry waste solvent and paint from the system.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A system for painting articles, comprising:
   an enclosed painting booth;
   a conveyor for transporting articles through said painting booth;
   a first rail located beside and extending along said conveyor;
   a second rail located beside and extending along said conveyor on a same side as said first rail and at an elevation different from an elevation of said first rail, wherein said first rail is positioned at an elevation higher than said second rail;
   a paint robot including an articulating arm mounted on said first rail for displacement along said first rail; and
   a panel opener robot including an articulating arm mounted on said second rail for displacement along said second rail whereby said paint robot and said panel opener robot can move past each other on said first rail and said second rail without interference.

2. The system according to claim 1 wherein said paint robot includes a base portion supported on said first rail, and said articulating arm supported on said base portion.

3. The system according to claim 1 wherein said panel opener robot includes: a door opener robot mounted on a first track of said second rail; and a hood/deck opener robot mounted on a second track of said second rail, such that said paint robot, said door opener robot, and said hood/deck opener robot can move past each other on said first rail and said second rail without interference.

4. The system according to claim 3 wherein said door opener robot includes a base supported on said second rail, and an articulating arm supported on said base portion.

5. The system according to claim 3 wherein said hood/deck opener robot includes a base portion supported on said lower rail, and an articulating arm supported on said base portion.

6. The system according to claim 1 including a device for limiting a side swing of said articulating arm of said paint robot such that the side swing narrows progressively as said paint robot approaches a limit of its travel on said first rail.

7. The system according to claim 1 wherein said paint robot includes a carriage mounted on said first rail and supporting said paint robot for rotational displacement, the system further comprising:
   a bundle of elongated tubes;
   a lower clamp member attached to said carriage for holding a portion of said bundle therein;

an upper clamp member attached to said articulating arm of said paint robot and spaced from said lower clamp member for receiving a second portion of said bundle therein; and a separator/control bar located along said bundle between said upper clamp member and said lower clamp member for securing each of said tubes to said separator/control bar at mutually spaced locations along a length of said separator/control bar.

8. The system according to claim 7 wherein said upper clamp member is a stack of connected clamps forming a first row of apertures and a second row of apertures offset and staggered with respect to said first row, said tubes being fitted into said apertures.

9. The system according to claim 7 wherein said lower clamp member is a stack of connected clamps forming a single row of apertures, said tubes being fitted into said apertures.

10. The system according to claim 7 wherein said tubes contain at least one of electric power supply, paint lines, pressurized air lines, and solvent lines.

11. The system according to claim 1 wherein said second rail is no closer to said conveyor than said first rail.

12. The system according to claim 1 wherein said second rail is disposed in substantially a same vertical plane as said first rail.

13. A method for painting articles, comprising the steps of:
a. providing an enclosed painting booth;
b. providing a conveyor for transporting articles through the painting booth;
c. locating a first rail beside and extending along the conveyor;
d. locating a second rail beside and extending along the conveyor on a same side as the first rail and at an elevation different from an elevation of the first rail, wherein said first rail is positioned at an elevation higher than said second rail;
e. mounting a paint robot including an articulating arm on the first rail for displacement along the first rail; and
f. mounting a panel opener robot including an articulating arm on the second rail for displacement along the second rail whereby the paint robot and the panel opener robot can move past each other on the first rail and the second rail without interference.

14. The method according to claim 13 wherein said step f. further comprises:
mounting the panel opener robot on a first track of the second rail; and
mounting another panel opener robot on a second track of the second rail, whereby each of the panel opener robots can pass the other one of the panel opener robots and the paint robot without interference.

15. The method according to claim 14 wherein the panel opener robot mounted on the first track of the second rail is a door opener robot and the another panel opener robot mounted on the second track of the second rail is a hood/deck opener robot.

16. The method according to claim 13 comprising at least one of the following steps:
limiting a side swing of the articulating arm of the paint robot whereby the side swing narrows progressively as the paint robot approaches a limit of its travel along the conveyor in the painting booth;
providing the paint robot with a tube-bundle control arrangement that allows the articulating arm to articulate in opposite directions from a straight alignment of the articulating arm; and
allowing the panel opener robot on the second rail to hold a panel and to release the panel only after a second panel opener robot engages and holds the panel.

17. A system for painting articles, comprising:
an enclosed painting booth;
a conveyor for transporting articles through said painting booth;
a first rail located beside and extending along said conveyor;
a second rail located beside and extending along said conveyor on a same side as said first rail and at an elevation different from an elevation of said first rail;
a paint robot including an articulating arm mounted on said first rail for displacement along said first rail; and
a panel opener robot including an articulating arm mounted on said second rail for displacement along said second rail, wherein said panel opener robot includes: a door opener robot mounted on a first track of said second rail; and a hood/deck opener robot mounted on a second track of said second rail, whereby said paint robot, said door opener robot, and said hood/deck opener robot can move past each other on said first rail and said second rail without interference.

18. The system according to claim 17 wherein said door opener robot includes a base supported on said second rail, and an articulating arm supported on said base portion.

19. The system according to claim 17 wherein said hood/deck opener robot includes a base portion supported on said second rail, and an articulating arm supported on said base portion.

* * * * *

UNITED STATES PATENT AND TRADEMARK OFFICE
CERTIFICATE OF CORRECTION

PATENT NO. : 7,622,158 B2  Page 1 of 1
APPLICATION NO. : 11/417368
DATED : November 24, 2009
INVENTOR(S) : Clifford et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 730 days.

Signed and Sealed this

Twenty-sixth Day of October, 2010

David J. Kappos
*Director of the United States Patent and Trademark Office*